Figure 3:
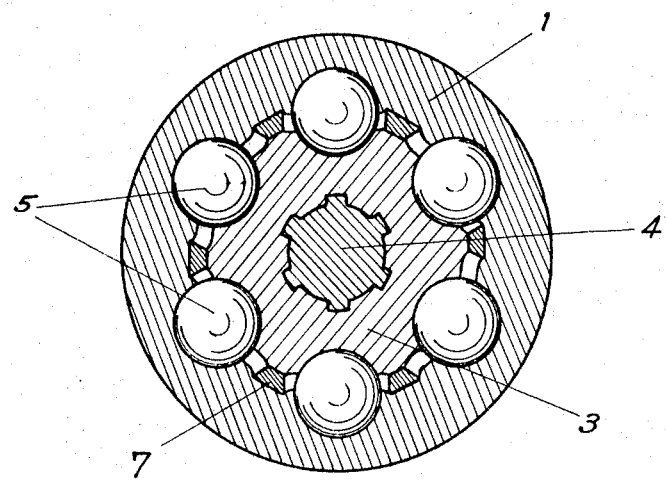

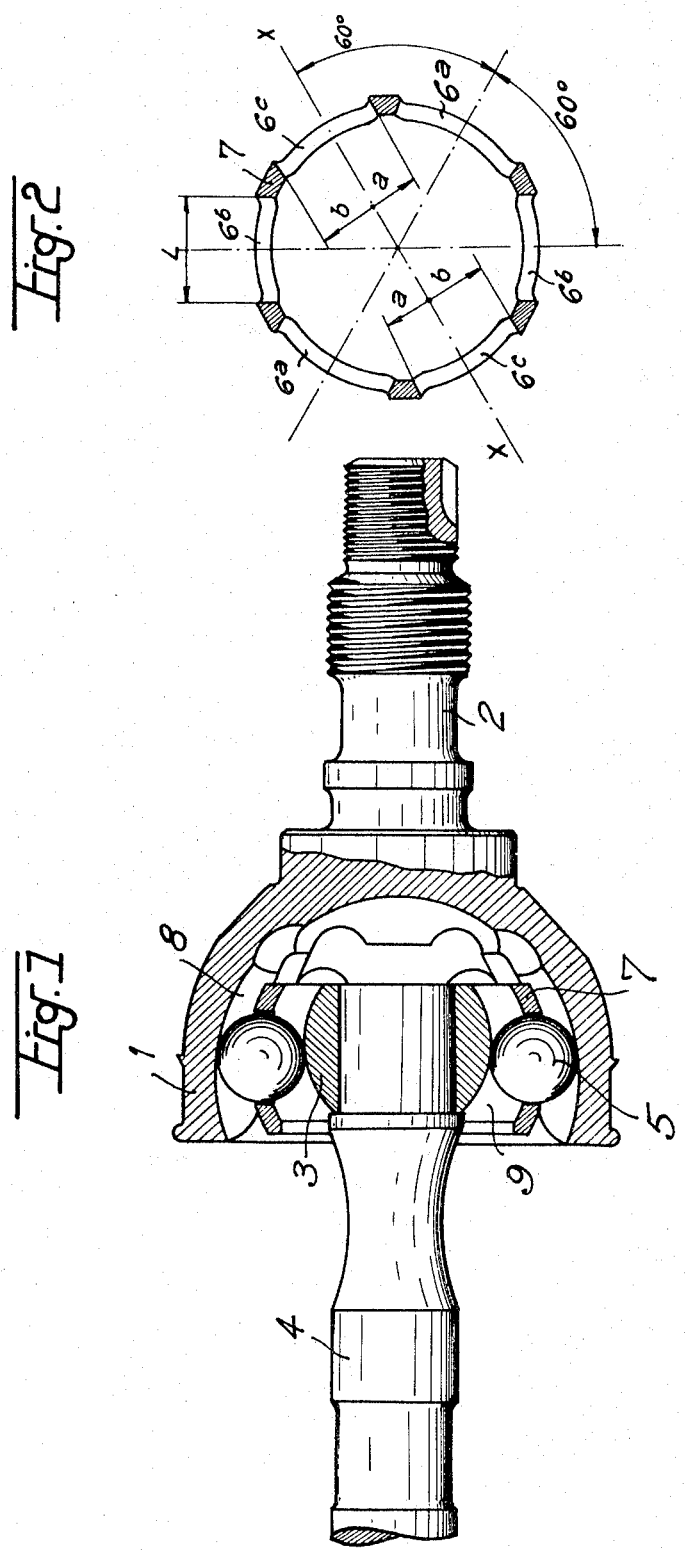

United States Patent Office 3,298,201
Patented Jan. 17, 1967

3,298,201
UNIVERSAL JOINT
Jean Cadiou, Paris, France, assignor to Societe Anonyme André Citroen, Paris, France, a French Company
Filed July 28, 1964, Ser. No. 385,685
Claims priority, application France, Aug. 1, 1963, 3,079, Patent 1,371,990
3 Claims. (Cl. 64—21)

The present invention relates to homokinetic and homocentric joints of the type comprising an outer element and an inner element or nut between which there is placed a guiding cage having apertures guiding balls engaged in toric grooves of the outer element and of the inner element or nut.

The apertures of the cage have a width substantially equal in diameter to the balls; but their length is higher than this diameter. In effect, when the shafts connected by the joint have their axes angularly displaced relative to each other, the distance between two adjacent balls is varied; and it is therefore necessary for these balls to move sideways in their apertures of the cage. During the assembling of the point, the outer element and the nut must be inclined relative to each other at an angle which is higher than the maximum steering lock. On the other hand, the length of two opposite apertures should be substantially equal to the thickness or axial dimension of the nut so as to allow the insertion of the latter inside the cage.

Thus in joints of the described type which have been manufactured until now, the length of two opposite apertures is substantially equal to the thickness of the nut. The other apertures all have the same length, and this latter length is smaller than that of the first two apertures but sufficient to permit the balls to be brought as near together as is necessary for their insertion.

If one wants to increase the maximum steering lock, it is necessary to increase the length of the apertures, which diminishes the strength of the cage. For this reason, it was impossible up to now to provide a joint with a steering lock as great as approximately 50°.

The object of the present invention is to provide a universal joint of the type described above, which is improved so as to permit an increase in the possible steering lock.

In the joint embodying this invention, the cage is provided with two relatively large opposing apertures of sufficient length to permit the insertion of the nut inside the cage, two relatively small opposing apertures having the necessary length for the desired steering lock, and lastly two middle-sized apertures of a length intermediate the lengths of the relatively large and small apertures and which are offset in the direction of the small apertures with respect to mid-positions between the centers of the adjacent large and small apertures, such middle-sized apertures being sufficiently long to allow the relative inclination of the outer element and of the nut which is necessary for the insertion of the balls inside the small apertures.

One form of a universal joint in accordance with the invention will now particuarly be described hereunder by way of example only with reference to the accompanying drawings, in which:

FIGURE 1 is an axial cross section of the joint;
FIGURE 2 is a transverse section of the cage; and
FIGURE 3 is a sectional view of the assembled joint taken along the line III—III on FIGURE 1.

As shown in FIGURES 1 and 3 of the drawings, the joint comprises an outer race element 1 which may be an integral part of a shaft 2 and the internal surface of which is substantially spherical, and a spherical nut or inner race element 3 which is locked with a shaft 4. Balls 5 are placed between the nut and the outer element 1 and these are maintained in apertures 6a, 6b or 6c of a guiding cage 7 and can move along toric grooves 8 and 9 of the element 1 and nut 3. The various apertures 6a, 6b and 6c all have a width substantially equal to the diameter of the balls. The internal surface of the element 1 and the outer surface of the inner element or nut 3 are spherical and concentric but the grooves 8 and 9 are eccentric with respect to the center of said surfaces and the eccentricities of grooves 8 and 9 have the same value but are in the opposite directions with respect to the elements 1 and 3, respectively. The cage 7 has concentric inner and outer surfaces corresponding to the outer and inner surfaces, respectively, of elements 1 and 3. The drawing shows clearly that the distance between balls depends on the steering lock.

The two apertures 6a are rectangularly-shaped and diametrically opposite to one another, and have a length at least equal to the thickness or axial dimension of the nut 3, so as to allow the insertion of the latter inside the cage.

The two diametrically opposed apertures 6b are centered with respect to a diametrical axis extending at an angle of 60° to the diametrical axis extending through the centers of the apertures 6a. The apertures 6b have a length L (FIG. 2) which is sufficient to permit the desired maximum steering lock and which is determined in laying out the steering assembly.

The apertures 6c are eccentric towards the apertures 6b with respect to the diametrical axis X—X at 60° from the axes of the apertures 6a and 6b. The distance $a$ between the axis X—X and the edge of an aperture 6c near an aperture 6a is substantially equal to $L/2$; on the other hand, the distance $b$ between the axis X—X and the other edge of the aperture 6c is greater than the distance $a$ and is sufficient to permit the sideways displacement of the balls that occurs when the axes of shafts 2 and 4 are angularly displaced to the extent necessary in order to put the balls in their right place in the apertures 6b. In practice, the difference between the lengths $a$ and $b$ is between $0.10$ and $0.35a$.

To assemble all parts, the nut or inner element 3 and the cage 7 are first placed inside the element 1; a ball is inserted in each of the apertures 6a. A ball is next set into place in each of the apertures 6c and lastly in each of the apertures 6b. The mounting order may however be different provided that the last ball inserted is placed in one of the apertures 6b and 6c.

If, as is usual, the nut 3 has a thickness which is greater than twice the distance $b$, one of the apertures 6a may have a length at least equal to the thickness of the nut, and the length of the other aperture 6a may be merely equal to twice the distance $b$.

What I claim is:
1. In a homokinetic universal joint comprising an outer element and an inner element having concentric spherical surfaces between which there is provided a guiding cage having apertures receiving balls which are thereby maintained in engagement with toric grooves provided in said surfaces of the inner and outer elements; said apertures of the cage including a first pair of diametrically opposed relatively large apertures at least one of which has a length as large as the axial thickness of said inner element to permit the assembly of the latter in said cage, a second pair of diametrically opposed relatively small apertures of sufficient length to permit the maximum desired angular displacement of said inner and outer elements during operation of the joint, and a third pair of diametrically opposed apertures of a length intermediate the lengths of said relatively large and relatively small apertures, respectively, each of said apertures of intermediate length being located between one of said relatively large apertures and one of said relatively small apertures and having its center offset in the direction toward the adjacent relatively small aperture with respect to a diametrical axis extending through the center of said surfaces of the inner and outer elements and which bisects the angle between diametrical axes extending through the centers of the adjacent relatively large and small apertures, the length of each of said apertures of intermediate length being sufficient to permit angular displacement of said outer and inner elements to the extent necessary for the insertion in said relatively small apertures of the respective balls.

2. A homokinetic universal joint according to claim 1; in which said length of each of said apertures of intermediate length is from 5 to 17% greater than said length of each of said relatively small apertures.

3. A homokinetic universal joint according to claim 1; in which said offset of each of said apertures of intermediate length is substantially equal to one-half the difference between the lengths of said apertures of intermediate length and said relatively small apertures, respectively.

References Cited by the Examiner
UNITED STATES PATENTS 1,665,280  4/1928  Rzeppa _____ 64—7
1,916,442  7/1933  Rzeppa _____ 64—21

FRED C. MATTERN, JR., *Primary Examiner.*

HALL C. COE, *Examiner.*